United States Patent
Aldrich

(10) Patent No.: US 8,625,926 B1
(45) Date of Patent: Jan. 7, 2014

(54) METHOD AND APPARATUS FOR PROCESSING IMAGE DATA FROM A PRIMARY SENSOR AND A SECONDARY SENSOR

(71) Applicant: Marvell International Ltd., Hamilton (BM)

(72) Inventor: Bradley C. Aldrich, Austin, TX (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/792,858

(22) Filed: Mar. 11, 2013

Related U.S. Application Data

(63) Continuation of application No. 12/109,094, filed on Apr. 24, 2008, now Pat. No. 8,396,321.

(60) Provisional application No. 60/913,914, filed on Apr. 25, 2007, provisional application No. 61/018,752, filed on Jan. 3, 2008.

(51) Int. Cl.
*G06K 9/00* (2006.01)
*G06K 9/40* (2006.01)
*H04N 5/228* (2006.01)

(52) U.S. Cl.
USPC ...... 382/275; 382/107; 348/208.1; 348/208.4

(58) Field of Classification Search
USPC .......................... 382/107, 254, 275; 348/497
See application file for complete search history.

(56) References Cited

U.S. PATENT DOCUMENTS

| | | | | |
|---|---|---|---|---|
| 5,777,612 | A * | 7/1998 | Kataoka | 715/203 |
| 6,173,317 | B1 * | 1/2001 | Chaddha et al. | 709/219 |
| 6,272,293 | B1 * | 8/2001 | Matama | 396/208 |
| 6,920,181 | B1 * | 7/2005 | Porter | 375/240.28 |
| 7,190,825 | B2 * | 3/2007 | Yoon | 382/154 |
| 7,626,612 | B2 * | 12/2009 | John et al. | 348/208.4 |
| 2005/0128297 | A1 * | 6/2005 | Katsuyama | 348/155 |
| 2005/0190274 | A1 * | 9/2005 | Yoshikawa et al. | 348/231.99 |
| 2005/0212749 | A1 * | 9/2005 | Marvit et al. | 345/156 |
| 2005/0270368 | A1 * | 12/2005 | Hashimoto | 348/61 |
| 2007/0013788 | A1 * | 1/2007 | Kaibara | 348/231.2 |
| 2008/0025640 | A1 * | 1/2008 | Trudeau et al. | 382/294 |

FOREIGN PATENT DOCUMENTS

| | | | |
|---|---|---|---|
| WO | WO 02104009 | * | 12/2002 |
| WO | WO02104009 A1 | | 12/2002 |

OTHER PUBLICATIONS

Ben-Ezra et al., "Motion-Based Motion Deblurring," IEEE Transactions on Pattern Analysis and Machine Intelligence, vol. 26, No. 6, pp. 689-698 (Jun. 2004).

* cited by examiner

*Primary Examiner* — Yubin Hung

(57) ABSTRACT

Systems and methods are provided for processing image data captured by a device. In one implementation, a system is provided to process primary image data based on motion of the device during generation of the image data, as detected by a secondary image sensor. In another implementation, a method is provided for processing image data by generating primary image data, generating secondary image data, calculating, using the secondary image data, at least one motion vector based on motion of the device during generation of the primary image data, processing the primary image data based on the at least one motion vector, and outputting the processed primary image data.

20 Claims, 10 Drawing Sheets

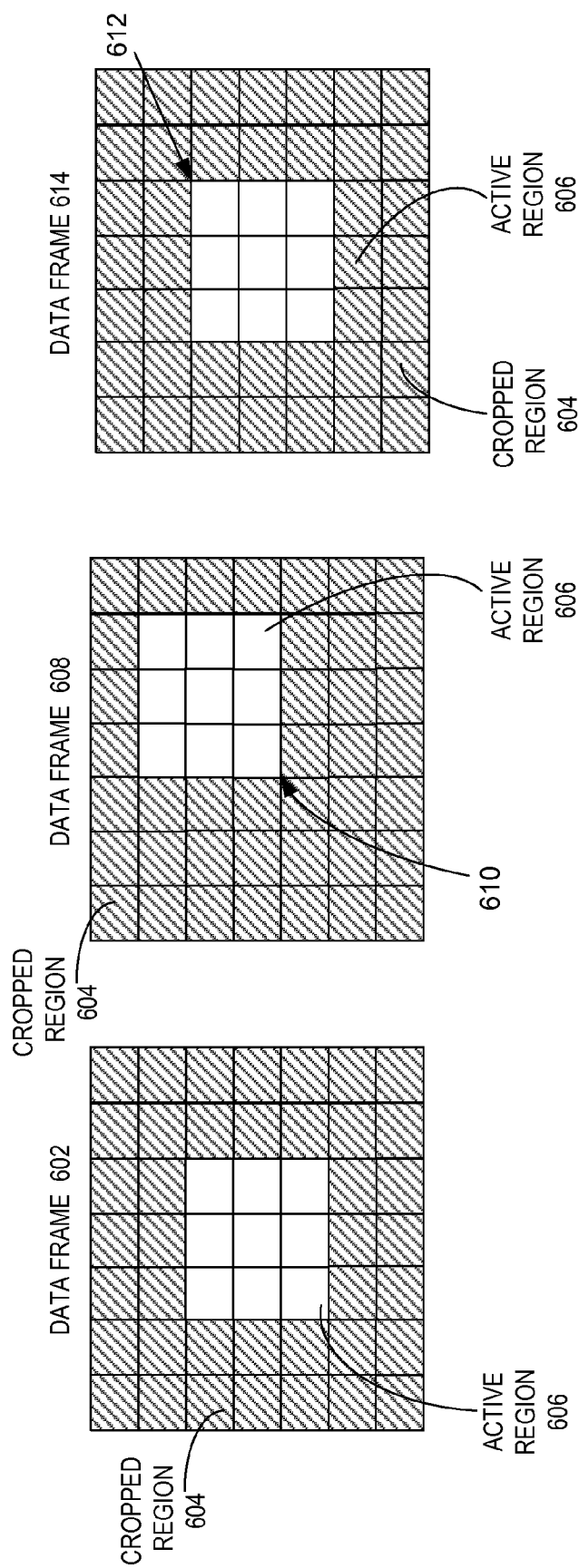

METHOD AND APPARATUS FOR PROCESSING IMAGE DATA FROM A PRIMARY SENSOR AND A SECONDARY SENSOR

CROSS REFERENCE TO RELATED APPLICATIONS

The present disclosure is a continuation of and claims priority to U.S. patent application Ser. No. 12/109,094, filed Apr. 24, 2008, now U.S. Pat. No. 8,396,321, issued Mar. 12, 2013, which claims priority to U.S. Provisional Patent Application No. 60/913,914, filed Apr. 25, 2007, and U.S. Provisional Patent Application No. 61/018,752, filed Jan. 3, 2008, which are incorporated herein by reference.

TECHNICAL FIELD

Systems and methods disclosed herein relate to the field of processing image data and, more specifically, to systems and methods of processing image data captured by handheld devices.

DESCRIPTION OF THE RELATED ART

For the past few years, handheld devices including digital cameras, cell phones, and personal digital assistants (PDAs) have been manufactured with the ability to generate and process image data. Users generally prefer smaller and lighter handheld devices, causing manufacturers to downsize components of the handheld devices, including digital circuits, image modules, image sensors, imaging screens, image stabilization modules, or the like. The downsizing of components may affect the ability of handheld devices to generate an adequate amount of image data required to produce a high quality image.

Users may use handheld devices to capture images in difficult environments including dimly-lit indoor venues such as concerts and bars, high-contrast outdoor venues with bright sunshine, and other environments which may not be ideal for producing a high quality image. Moreover, handheld image capture devices are often used without tripods or even using only one hand. Further, users may shake or move their hands during image capturing, causing handheld devices to shake. The handshake or camera motion during image capture may be referred to as jitter. Shaking of the handheld devices during image capture may lead to producing of unstable video sequences and blurry still images. The unresolved effects of jitter on image producing abilities of the handheld devices may be increased by zoom operations, which may magnify motion associated with users' hands, by use of higher resolution image sensors, which may shrink the pixel size of captured image data, causing the blur effect to span more pixels; and use of slow shutter speeds.

To compensate for the above-mentioned deficiencies image stabilization modules have been used in handheld devices. Image stabilization modules may generate motion vectors associated with jitter induced by hand movement of the user to process the image data and compensate for the jitter. One way of generating these motion vectors is to measure displacement in the x and y directions by using a mechanical gyroscope. To keep costs low and sizes of handheld devices manageable, mechanical gyroscopes may be implemented by using Micro-ElectroMechanical Systems (MEMS). However, both mechanical gyroscopes and gyroscopes being implemented using MEMS are difficult to implement in a limited space and may require additional circuitry, thereby increasing the size of the handheld devices. Further, many image stabilization modules compensate for jitter by adjusting image data after the image data has been processed, thus requiring additional processing capabilities leading, in turn, to increased power consumption.

SUMMARY

In one embodiment consistent with the invention, a system for processing image data captured by a device is provided. The system comprises a primary image sensor to generate primary image data, a secondary image sensor to generate secondary image data, a correlation circuit to calculate, using the secondary image data, at least one motion vector based on motion of the device during generation of the primary image data, and a data processor to process the primary image data based on the at least one motion vector.

Consistent with another embodiment of the present invention, there is provided a system for processing image data captured by a device, the system comprising a liquid crystal display (LCD) panel for previewing a scene, a keypad panel to generate a trigger event to terminate the previewing of the scene, the trigger event to initiate generation of primary image data, an image sensor generating reference image data, during the previewing and generating the primary image data after the trigger event initiates primary image data generation, a correlation circuit to calculate at least one motion vector based on motion of the device during the previewing, the at least one motion vector being calculated using the reference image data, and a data processor to process the primary image data based on the at least one motion vector In certain embodiments, the system may also include a memory device to store the processed primary image data. The system may also include a transmitter/receiver to transmit the processed primary image data, a buffer to provide the plurality of data frames of the secondary image data to the correlation circuit, and a kernel estimation circuit to convert the at least one motion to a spatially varying function.

In another embodiment consistent with the present invention, a method for processing image data captured by a device, is provided. The method comprises generating primary image data, generating secondary image data, calculating, using the secondary image data, at least one motion vector based on motion of the device during generation of the primary image data, processing the primary image data based on the at least one motion vector, and outputting the processed primary image data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments. In the drawings:

FIG. 6 is a schematic diagram illustrating the use of cropping parameters to adjust video image data, consistent with one embodiment of the invention;

DESCRIPTION OF THE EMBODIMENTS

In the following description, for purposes of explanation and not limitation, specific techniques and embodiments are set forth, such as particular sequences of steps, interfaces and configurations, in order to provide a thorough understanding of the techniques presented herein. While the techniques and embodiments will primarily be described in context with the accompanying drawings, the techniques and embodiments can also be practiced in other circuit types.

Reference will now be made in detail to the exemplary embodiments of the invention, examples of which are illustrated in the accompanying drawings. Wherever possible, the same reference numbers will be used throughout the drawings to refer to the same or like parts.

Figure 1:
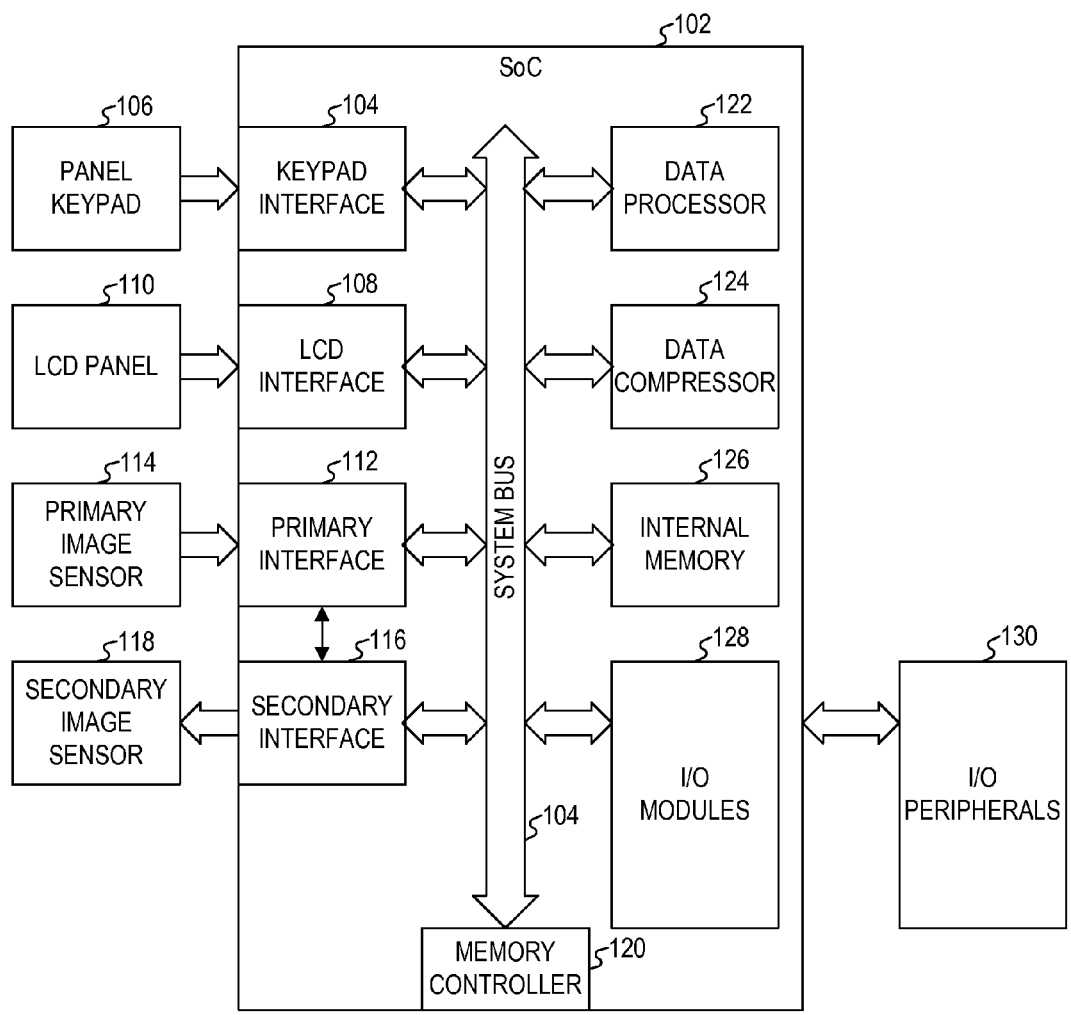
FIG. 1 is a block diagram illustrating a system for processing image data, consistent with one embodiment of the invention.

FIG. 1 illustrates a system 100 for processing image data, consistent with one embodiment of the invention. System 100 may be integrated in a handheld device such as a digital camera, a cell phone, or a PDA. System 100 may comprise a system-on-chip (SoC) 102. SoC 102 may include a plurality of modules, which may interface with each other using a system bus 104. The plurality of modules in SoC 102 may also interface with external circuitry and modules. For example, SoC 102 may include a keypad interface 104 which may be connected to a panel keypad 106, a liquid crystal display (LCD) interface 108 which may be connected to a LCD panel 110, a primary interface 112 which may be connected to a primary image sensor 114, a secondary interface 116 which may be connected to a secondary image sensor 118, and a memory controller 120.

SoC 102 may also include a data processor 122, a data compressor 124, an internal memory 126, and input/output (I/O) modules 128 which may be connected to various I/O peripherals 130. I/O modules 128 may include one or more of a secure digital input output (SDIO) port, a universal asynchronous receiver/transmitter (UART), audio codec interfaces, and any other modules required for the functioning of SoC 120. I/O peripherals 130 may include one or more of a secure digital card, a software-defined radio (SDR), a camera flash, Bluetooth or Wi-Fi transceivers, a speaker, a microphone, an external memory, and other peripherals required for the functioning of system 100 within a handheld device. Internal memory 126 and external memory may comprise various types of volatile or non-volatile memory, including RAM, DRAM, SRAM, ROM, EPROM, EEPROM, flash memory, or any other medium which can be used to store image data.

A user of a handheld device that includes system 100 may initiate the handheld device by using panel keypad 106 to take a picture. Panel keypad 106 may transmit a signal to liquid crystal display (LCD) interface 108, via system bus 104. LCD interface 108 may initialize LCD panel 110, which may enable the user to preview a scene of the environment that the user may be trying to capture as a video or still image. The user may further use panel keypad 106 to activate primary image sensor 114 to generate image data corresponding to the image displayed in LCD panel 110. The generated image data may include a single data frame for a still image or multiple frames of data for a video corresponding to the environment.

Secondary image sensor 118 may also be activated in relation to primary image sensor 114 and may begin generating reference and/or secondary image data. Secondary image sensor 118 may begin generating reference image data at the same time as initialization of LCD panel 110, or at the same time as the activation of primary image sensor 114, or a short period before or after the activation of primary image sensor 114. Secondary image sensor 118 may operate at a higher frame rate than primary image sensor 114 to generate reference images including a plurality of data frames. The plurality of data frames may represent a video corresponding to an extended scene of the environment in which the handheld device may be operated in. Secondary image sensor 118 may be pointed in an opposite direction from primary image sensor 114. For example, the reference image data may be a video of the user's face or the reference image data may be a video of an extended scene at a different angle, such as 180 degrees, from the scene that may be displayed on LCD panel 110.

Primary image sensor 114 and secondary image sensor 118 may be implemented on one or more chips and may include integrated image signal processors (ISPs) together with at least one of a complementary metal-oxide-semiconductor (CMOS) sensor, charge coupled device (CCD) sensor, or any other sensor that generates pixel data.

As is described in further detail below, data processor 122 may analyze the reference image data to calculate parameters corresponding to the scene displayed on LCD panel 110. The parameters may be provided to primary interface 116. Primary interface 116 and data processor 122 may use the parameters during processing of the raw image data and may perform correction algorithms such as de-convolution, image stabilization, filtration, blur reduction, and kernel estimation, on raw image data.

For example, the reference image data may be analyzed to determine scene spatial correction parameters, temporal correction parameters that may be relative to the time during which image data may have been generated, and any other parameter that may be used to calculate motion vectors corresponding to jitter of the handheld device induced by, for example, hand movement of the user during image capturing. In general, system 100 is an exemplary system and may include features and/or variations in addition to those set forth herein. For example, a plurality of image sensors may be used to generate reference image data and motion detection devices aside from secondary image sensor 118 may be incorporated into system 100, which may calculate motion vectors corresponding to the hand movement of the user. Reference image data generated by the plurality of image sensors may provide additional information with respect to the motion of the handheld device and may be used to improve the accuracy of the correction algorithms. Miniature gyroscopes may be implemented using MEMS to provide a stream of displacements relating to motion of a user's hand. Further, the plurality of image sensors may be used in combination with miniature gyroscopes to improve precision and granularity of the calculations.

Primary image sensor 114 may be set to begin generating image data at the initialization of LCD panel 110, and image data generated by primary image sensor 114, during preview, may be used as reference image data analyzed by data processor 122. Panel keypad 106 may generate a trigger event, to activate primary image sensor 114 to generate image data corresponding to the image displayed in LCD panel 110. The trigger event may terminate the preview and primary image sensor 114 may send the image data generated during preview to primary interface 112 for analysis.

Image data generated by primary image sensor 114 and reference image data generated by secondary image sensor 118 may be provided to primary interface 112 and secondary interface 116 respectively. Necessary control signals for synchronization of the image data and the reference image data may also be provided by image sensors 114 and 118 to interfaces 112 and 116, respectively. The control signals may include vertical synchronization signals, horizontal synchronization, and timing signals such as frame valid, line valid and time valid. Interfaces 112 and 116 may synchronize the image data with the reference image data. The synchronization of the image data may allow a frame of image data generated by primary image sensor 114 to be correlated in time with a frame of image data generated by secondary image sensor 118. The synchronization may be performed by for example, embedding a count value for each data frame provided to interfaces 112 and 116, where each image data frame may be embedded with a count value representing a time stamp. A time stamp of each image data frame generated by primary image sensor 114 may be matched with a time stamp of a corresponding image data frame generated by secondary image sensor 118. Further, control signals may be used to directly synchronize image data frames generated by primary image sensor 114 with image data frames generated by secondary image sensor 118.

Memory controller 120 may transmit the synchronized image data and store the synchronized image data in internal memory 126 via system bus 104. Data processor 122 may access the stored image data and may analyze the reference image data to calculate various values including environmental parameters, and/or blur reduction parameter, and/or motion vectors. Primary interface 116 and data processor 122 may then process the image data generated by primary image sensor 114 and stored in internal memory 126, using the calculated values. As is described in further detail below, processing the image data may include applying different algorithms to the image data in order to produce a high quality image. The processed image data may be transmitted to data compressor 124 via system bus 104. Data compressor 124 may compress the processed image data and may transmit the compressed image data to I/O modules 128. I/O modules 128 may display the compressed image data as a high-quality image on LCD panel 110 or I/O modules may transmit the high-quality image to I/O peripherals 130 for further transmission or permanent storage.

Figure 2:
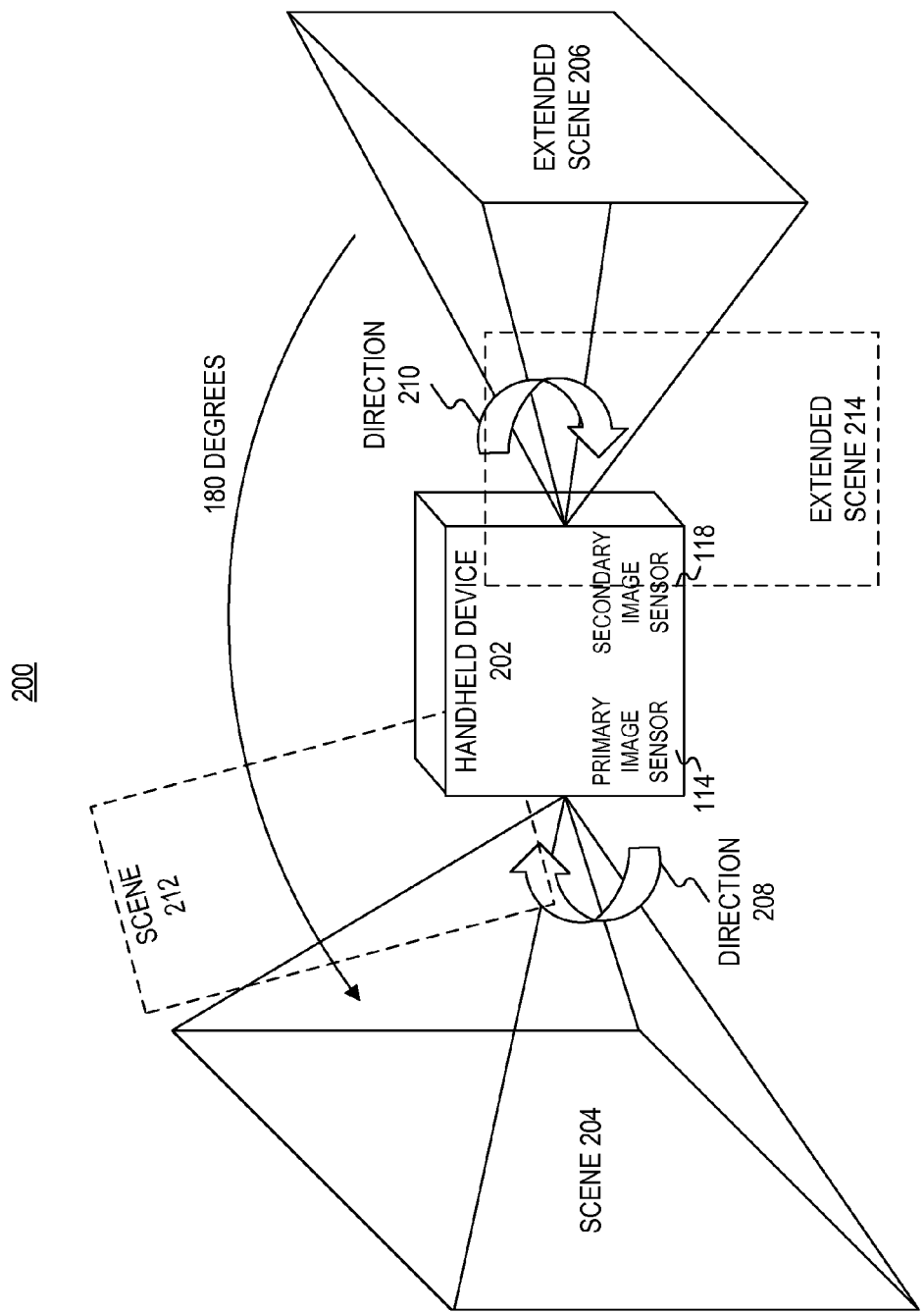
FIG. 2 is a schematic diagram illustrating operation of a system for processing image data in an environment, consistent with one embodiment of the invention.

FIG. 2 illustrates an example of an environment 200 in which a handheld device 202 may be used to capture a (first) scene 204 and an extended (second) scene 206. Handheld device 202 may include primary image sensor 114 and secondary image sensor 118. In one embodiment, secondary image sensor 118 may be pointed in a direction 180 degrees away from primary image sensor 114. For example, when a user captures a video or still image of scene 204, primary image sensor 114 may generate one or more data frames corresponding to scene 204 and secondary image sensor 118 may generate data frames corresponding to extended scene 206. During video capture of scene 204, the user may rotate handheld device 202 in direction 208, which may cause primary image sensor 114 to generate data frames corresponding to scene 212. Further, due to the rotation, secondary image sensor may move in direction 210 and may generate data frames corresponding to extended scene 214. Generating multiple data frames of image data may provide handheld device 202 with more image data regarding environment 200 and analyzing the image data may enable handheld device 202 to adjust image data and/or settings of handheld device 202 to produce a high-quality image or video of the scene that the user is trying to capture.

Figure 3:
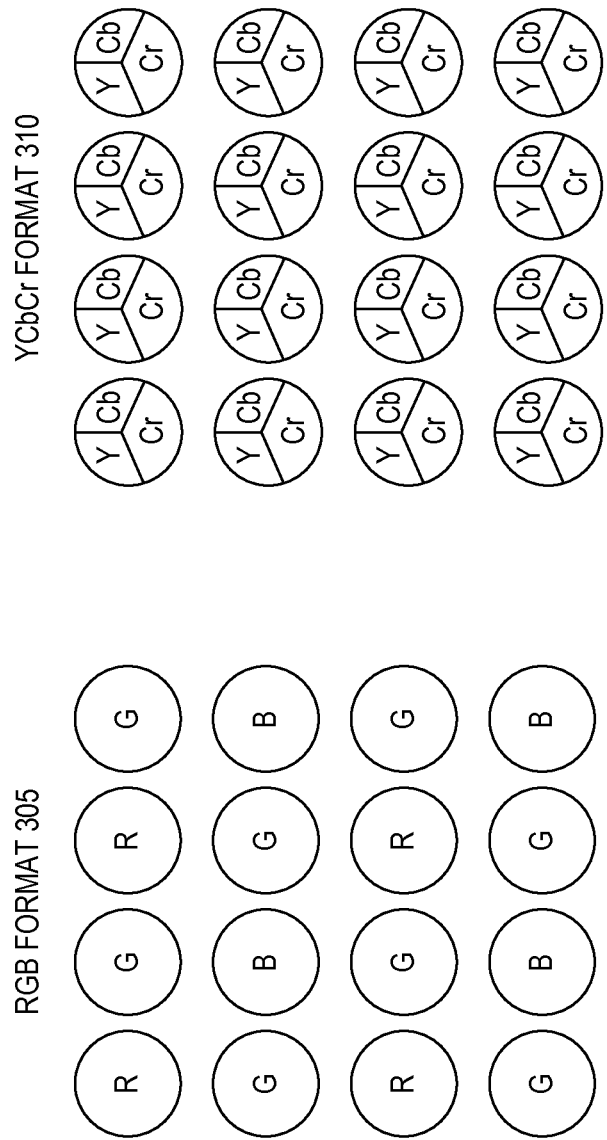
FIG. 3 is a schematic diagram illustrating the structure of pre-processed image data, consistent with one embodiment of the invention.

FIG. 3 shows examples of raw Bayer pixel data in RGGB format (305) and YCbCr format (310). RGGB format 305 and YCbCr format 310 may represent pixels of image data generated by primary image sensor 114 and secondary image sensor 118. RGGB format 305 may be raw Bayer data which may not have been processed by various camera processing modules or RGGB format 305 may be raw Bayer data which may have been partially processed by various camera processing algorithms. YCbCr format 310 may represent processed raw Bayer data. The image data may be provided to SoC 102 in raw format because external resources may be required to process the image data and elimination of the external resources may reduce implementation cost of systems such as system 100.

Figure 4A:
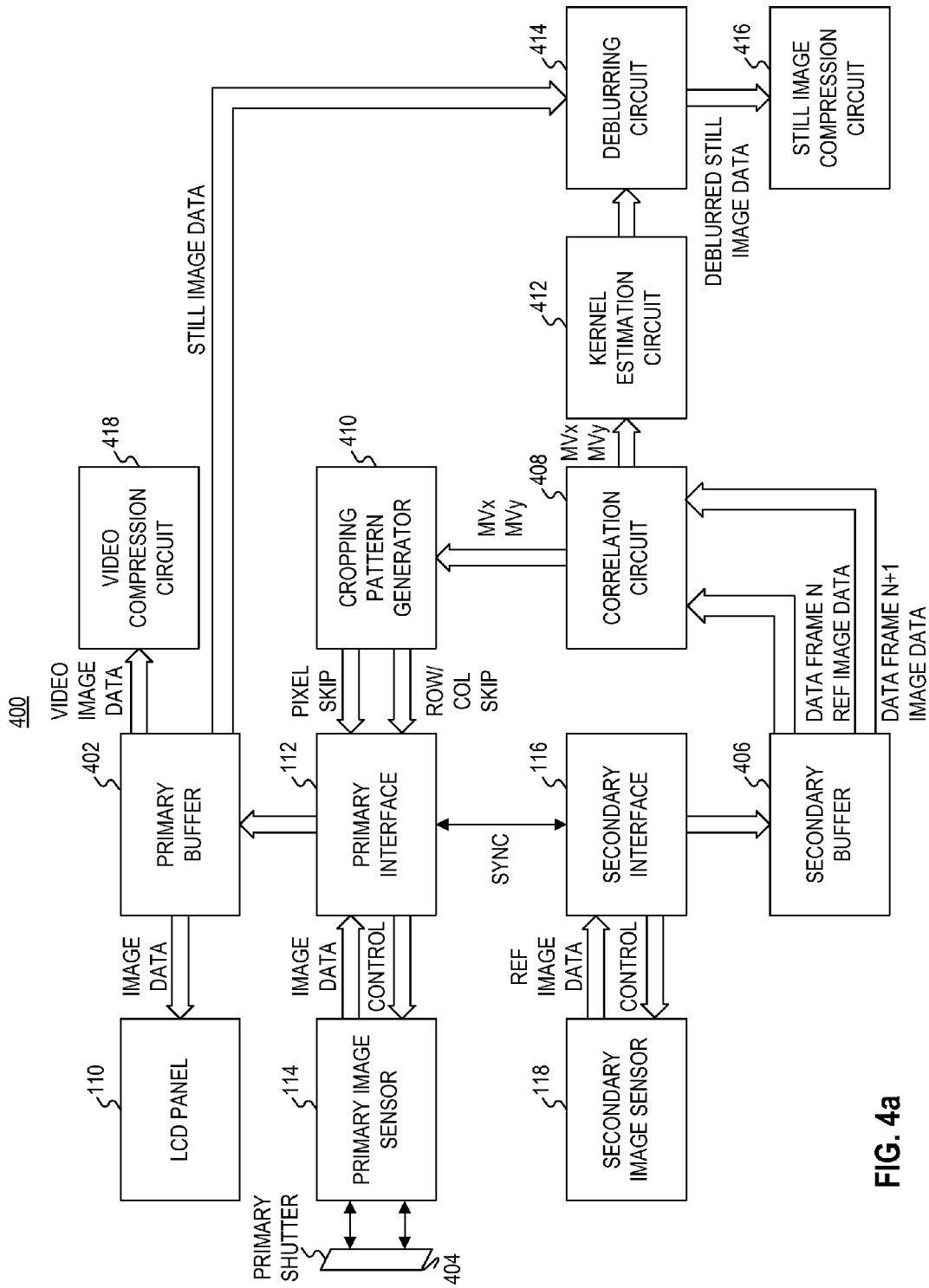
FIG. 4a is a schematic diagram illustrating a system for processing and adjusting image data, consistent with one embodiment of the invention.

Referring now to FIG. 4a, a system 400 for processing and adjusting image data, is provided. System 400 may also be integrated in a handheld device such as a digital camera, a cell phone, or a PDA. Similar to system 100, system 400 may also include LCD panel 110, primary interface 112, primary image sensor 114, secondary interface 116, and secondary image sensor 118. Further, system 400 may include a primary buffer 402, a primary shutter 404, a secondary buffer 406, a correlation circuit 408, a cropping pattern generator 410, a kernel estimation circuit 412, a deblurring circuit 414, a still image compression circuit 416, and a video compression circuit 418.

LCD panel 110 may be used by a user to preview a scene to be captured as a video or as a still image. The user may initialize primary image sensor 114 to generate image data corresponding to the scene. Alternatively, primary image sensor 114 may be set to automatically initialize and generate image data corresponding to the scene, while the user is previewing the scene. The image data generated by primary image sensor 114 is provided to primary interface 112. The image data may be provided to primary interface 112 prior to processing and may be raw Bayer pixel data.

Secondary image sensor 118 may also begin generating reference image data including data frames representing a video of an extended scene of the environment that the handheld device may be operated in. Secondary image sensor 118 may operate at a higher frame rate than primary image sensor 114 and may provide the reference image data to secondary interface 116. Image sensors 114 and 118 may also provide synchronization control signals to interfaces 112 and 116. Interfaces 112 and 116 may synchronize the image data and the reference image data and secondary interface 116 may provide the synchronized reference image data to secondary buffer 406.

Secondary buffer 406 may provide data frames of reference image data to correlation circuit 408 and correlation circuit 408 may compute motion vectors $MV_x$ and $MV_y$. Motion vector $MV_x$ may represent the hand movement of the user in the horizontal direction, at a particular time during generation of the reference image data and may be calculated by measuring the displacement in the horizontal direction between two data frames of reference image data. Motion vector $MV_y$ may represent the hand movement of the user in the vertical direction at a particular time during generation of the reference image data, and may be calculated by measuring displacement in the vertical direction between two data frames of reference image data. Each motion vector may be calculated using various known block matching algorithms.

Figure 4B:
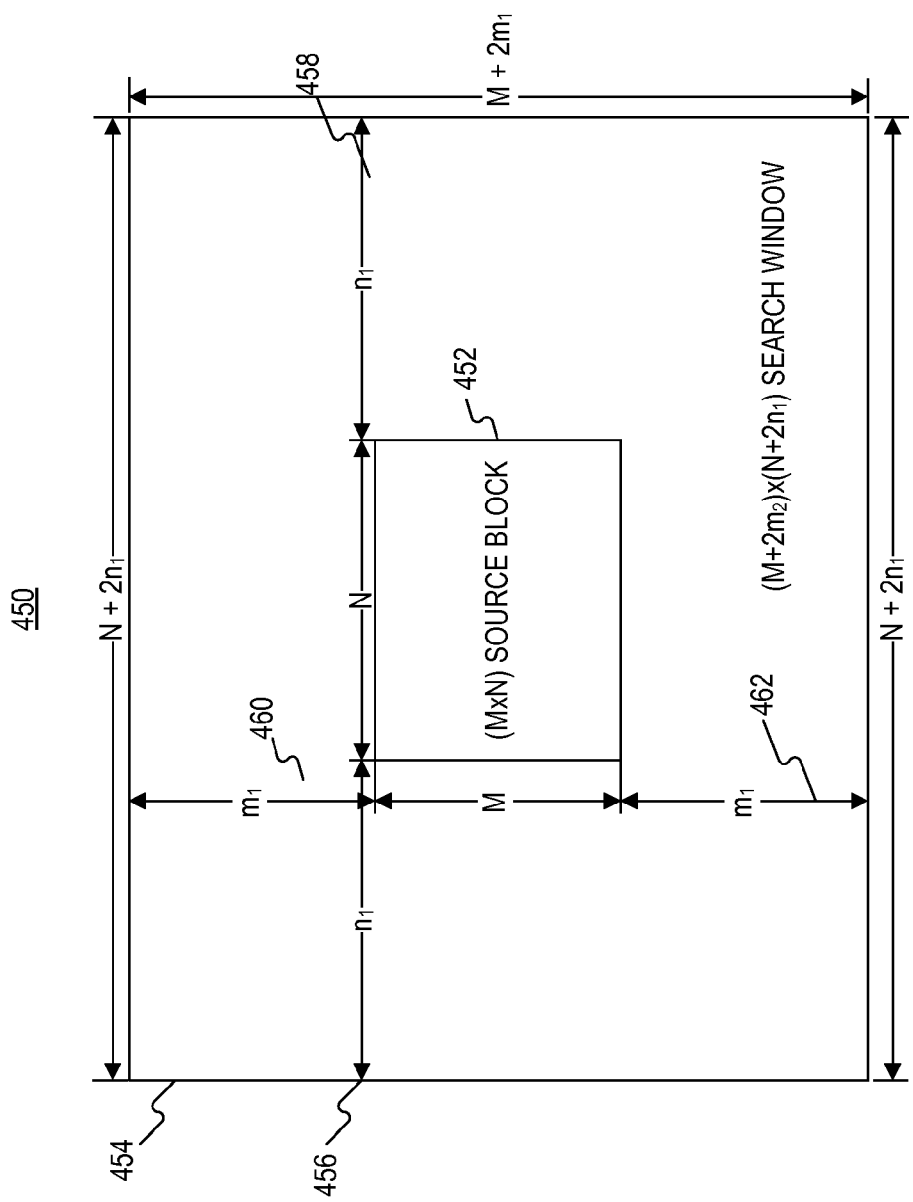
FIG. 4b is a schematic diagram illustrating a two-dimensional source block of image data, consistent with one embodiment of the invention.

Referring now to FIG. 4b, block matching algorithms may be used to measure displacement of source block 452, with respect to search window 454. Search window 454 may represent a two-dimensional $N+2n_1 \times M+2\ m_1$ block of image data corresponding to data frames of reference image data generated by, for example, secondary image sensor 118 of system 400. Source block 452 may represent a two-dimensional M×N block of image data corresponding to a data frame of image data generated by, for example, primary image sensor 114 of system 400. Further, source block 452 may represent image data generated between the generation of two data frames of reference image data. Horizontal and vertical displacements of source block 452 may be calculated with reference to search window 454 and the displacements may be used to calculate motion vectors for source block 452.

As is illustrated in FIG. 4b, N, M, $n_1$, and $m_1$ may represent various lengths that may be used as constraints while applying block matching algorithms. For example, $n_1$ may represent a number of columns of regions 456 and 458 and $m_1$ may represent a number of rows of regions 460 and 462. The horizontal and vertical displacement of source block 452 may be calculated with respect to displacement over a number of rows and columns. Block matching algorithms may be used to implement a motion estimation component of source block 452. The size of search window 454 may constrain the range of the motion vector and a cost function may be defined by using a number of elements within a block, a metric used for block comparisons, number of comparisons required for each block, and a displacement search pattern. Motion vectors may be calculated by using the following equations:

$$SAD(dx, dy) = \sum_{n=dx}^{dx+N-1} \sum_{m=dy}^{dy+M-1} |x(m, n) - y(m + dx, n + dy)| \quad (1)$$

$$(MVx, MVy) = \min_{(dx,dy) \in \mathfrak{R}} {}^2 SAD(dx, dy) \quad (2)$$

$$C_{FullSearch}(2n_1+1) \times (2m_1+1) \times (M \times N) \quad (3)$$

where equation 1 represents a Sum-of-Absolute (SAD) functions and may be used to calculate displacement between individual rows and columns of source block 452 and equation 2 may be used to calculate a motion vector using the results from equation 1. Similarly, a sum of displacements of all rows and all columns, in search window 454, may be calculated using equation 3. Alternatively, fast search algorithms may be used to calculate displacements within sub-samples of search window 454. For example, Three Step Search (TSS) algorithm, Logarithmic search algorithm, and interpolation operations may be used in combination with SAD to correlate source block 452 with adjacent frames of image data and correlate pixels of image data of source block 452 with adjacent frames of image data.

Returning now to FIG. 4a, correlation circuit 408 may calculate sets of motion vectors corresponding to the hand movement of the user at particular time instances during generation of the reference image data. Each motion vector may be referred to as a global motion vector and may represent a particular position in the generated image data. Multiple global motion vectors may be needed to deblur and/or remove jitter from image data. If the image data generated by primary image sensor 114 comprises video data, correlation circuit 408 may provide the computed sets of motion vectors to cropping pattern generator 410.

Cropping pattern generator 410 may generate cropping parameters based on the sets of motion vectors and may provide the cropping parameters to primary interface 112. Based on the cropping parameters, primary interface 112 may adjust image data corresponding to the video captured by the user. The image data may be adjusted to remove the effects of jitter caused by hand movement of the user during capturing of the video. For example, cropping pattern generator 410 may generate cropping parameters corresponding to each data frame of raw or unprocessed image data provided to primary interface 112 by primary image sensor 114. Primary interface 112 may skip a particular row or column of pixels while processing each data frame of the raw or unprocessed image data, based on the cropping parameters.

After processing of the raw or unprocessed image data is complete, primary interface 112 may provide synthesized data frames of image data to primary buffer 402. The synthesized data frames may correspond to a video of a scene captured by the user. The video may be of a high quality due to the removal of rows or columns pixels during synthesis and processing of the image data. The video may be sent to LCD panel 110 for display or may be sent to video compressor 418 and may be compressed for storage in internal or external memory (not shown) of system 400.

When the image data generated by primary image sensor 114 corresponds to a still image, primary interface 112 may send the raw image data corresponding to the still image to primary buffer 402, before processing the image data. Primary buffer 402 may send the received raw image data to deblurring circuit 414. Further, depending on the type of shutter or shutter mode being used for primary shutter 404, correlation circuit 408 may provide the computed sets of motion vectors to kernel estimation circuit 412 or may provide the global motion vectors to kernel estimation circuit 412. Kernel estimation circuit 412 may use the global motion vectors to calculate a global correction kernel to deblur the still image.

For example, primary shutter 404 may be an electronic or global shutter (referred to hereinafter as "global shutter"), and correlation circuit 408 may provide the global motion vector to kernel estimation circuit 412. A global shutter may operate like a mechanical shutter and may expose the entire scene, corresponding to the still image, to primary image sensor 114. Primary image sensor 114 may generate image data corresponding to the still image and primary interface 112 may collectively readout all of the image data generated by primary image sensor 114. The user may move his hand while capturing the scene and the hand movement may produce a global blur. The global blur may be dependent on the speed of the global shutter and may be represented by the global motion vector provided to kernel estimation circuit 412. Kernel estimation circuit 412 may use the global motion vector to form a point spread function (PSF) and may provide the PSF to deblurring circuit 414, as is known to those of skill in the art.

Deblurring circuit 414 may adjust the image data received from primary buffer 402 and remove the global blur from the received image data based on the PSF. The global blur from the image data may be removed by using various algorithms such as de-convolution of the PSF and raw image data, inverse filtering, and interpolation operations in a manner known to those of skill in the art.

Alternatively, primary image sensor may include a rolling shutter mode, and correlation circuit 408 may provide sets of motion vectors that represent the hand movement of the user at particular time instances during generation of the image data and the reference image data. During capture of the still image, the rolling shutter mode may expose different portions of the scene to primary image sensor 114 at different times and primary image sensor 114 may generate different rows or columns of pixels of a single data frames of image data at different times. The generated rows or columns of pixels may be read out from the primary image sensor 114 as the rows or columns of pixels are generated and may cause separate blurs in the still image.

Kernel estimation circuit 412 may use the sets of motion vectors provided by correlation circuit 408 to adjust the raw image data provided by primary buffer 402. Kernel estimation circuit 412 may spatially vary kernel coefficients to adjust for the different read-out times of the different rows or columns and may vary kernel coefficients to adjust for the separate blurs caused by different motion vectors. For example, when a motion vector for a particular area in an image indicates a displacement of ten in x direction and twelve in the y direction and a motion vector of an area adjacent to the particular area indicates displacement of five in the x direction and two in the y direction, the kernel coefficients may be adjusted to account for the different displacements. Further, the kernel coefficient may be provided to deblurring circuit 414. The deblurring circuit may remove the blur by using the sets of motion vectors to model the hand movement as uniform linear motion in x (horizontal) and y (vertical) directions for each generated row or column and may adjust each row or column accordingly.

Figure 5:
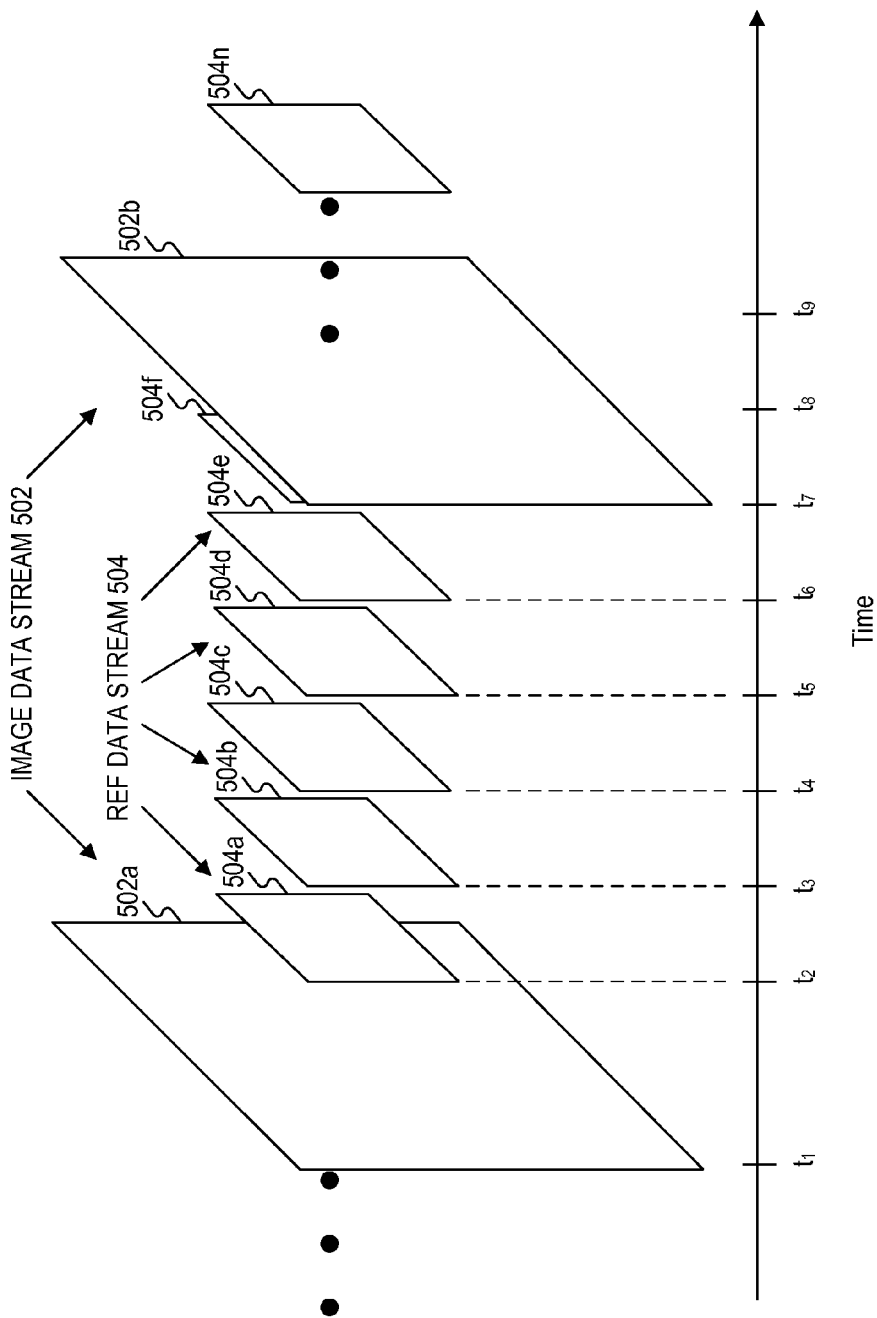
FIG. 5 is a timing diagram illustrating streams of video image data, consistent with one embodiment of the invention.

FIG. 5 illustrates a timing diagram displaying the generation of image data stream 502 and reference data stream 504, with respect to time. Image data stream 502 may be generated by primary image sensor 114, in system 100 or 400, or handheld device 202, and may include data frames 502a-b. Image data stream 502 may represent a video of a scene captured by the user and the quality of the video may be effected by motion artifacts. Motion artifacts may be caused by movement of the hand of the user during video image capturing of the scene and any motion of an object present in the scene. The resultant motion artifact that may effect the quality of image data stream 502 may be represented by the equation:

$$MV_{Resultant}(x,y,t)=MV_{User}(x,y,t)+MV_{Scene}(x,y,t), \quad (4)$$

where $MV_{User}(x, y, t)$ may represent a motion vector corresponding to the hand movement of the user, $MV_{Scene}(x, y, t)$ may represent a motion vector corresponding to any motion of an object present in the scene, x may represent movement in the horizontal direction, y may represent movement in the vertical direction, and t may represent the instance of time corresponding to the calculated motion vector.

Reference image data stream 504 may be generated by secondary image sensor 118, in system 100 or 400, or handheld device 202, and may include reference data frames 504a-n. Reference data frames 504a-n may represent a video of an extended scene of the environment that the handheld device is being operated in and it may be a video of a scene opposite to or in a different direction relative to the scene that may be represented by image data stream 502. Reference data stream 504 may consist of more frames than image data stream 502. For example, image data stream 502 may include two data frames 502a and 502b between time $t_1$ and $t_7$ and reference data stream 504 may include six data frames 504a-f between time $t_1$ and $t_7$. Data frames 504a-n may be used to calculate a plurality of motion vectors ($MV_{User}(x, y, t)$) that may represent the motion artifacts caused by the hand movement of the user during video image capturing. The motion vectors may be used to adjust image data stream 502 such that $MV_{Resultant}(x, y, t)$ of the image data stream may approximately be equal to $MV_{Scene}(x, y, t)$, after the adjustments have been made.

For example, to adjust data frames 502a and 502b, a motion vector may be calculated to represent movement in the x and y direction between each data frame 504a-n. A motion vector that may represent the movement between data frames 504a and 504b, may be calculated between time $t_2$ and $t_3$. Similarly, motion vectors may be calculated between time $t_3$ and $t_4$, $t_4$ and $t_5$, $t_5$ and $t_6$, and $t_6$ and $t_7$ that may represent the movement between data frames 504b and 504c, 504c and 504d, 504d and 504e, and 504f, respectively. These motion vectors may be used to adjust data frames 502a and 502b and remove any effects that hand movement of the user or jitter of the handheld device may have on the quality of data frames 502a and 502b. Further, the motion vectors may also be used to calculate a global motion vector that may be provided to kernel estimation circuit 410, of system 400.

FIG. 6 illustrates adjusting a frame of image data using cropping parameters that may be generated by, for example, cropping pattern generator 410 of system 400. Data frame 602 may represent a data frame of video image data that may be generated when a user may capture a video of a scene. Data frame 602 may be generated by, for example, primary image sensor 114 of system 100 or 400, or handheld device 202, and may be generated during video capturing in which there may be no jitter in data frame 602.

Data frame 602 may represent a data frame that may have been synthesized and processed when no hand movement of the user is present by, for example, data processor 122 in system 100, or primary interface 112 in system 100 or 400, and may include cropped region 604 and active region 606. Regions 604 and 606 may include rows and columns of pixels. Cropped region 604 may include rows and columns of pixels that may be cropped out of data frame 602 during processing and synthesizing of the image data and active region 606 may include rows and columns of pixels that may constitute a processed and synthesized data frame representing a portion of the scene captured by the user.

Data frame 608 may represent cropped region 604 and active region 606 that have been affected by jitter that may be caused by hand movement of the user, during capturing of video image data. As is shown in FIG. 6, active region 606 may have shifted in direction 610 and may include rows and columns of pixels that may have been cropped when there was no hand movement. To adjust the shift of active region 606 in data frame 608, data frames (not shown) of reference image data may be used to calculate motion vectors corresponding to the hand movement of the user. These motion vectors may be used by, for example, cropping generator 410 to generate cropping parameters. Cropping parameters may be used to shift active region 606 in direction 612 and produce an adjusted data frame 614. Adjusted data frame 614 may constitute a processed and synthesized data frame that may not be affected by jitter and may represent a portion of the scene captured by the user. Each data frame representing the scene captured by the user may be adjusted by using the method described above.

Figure 7A:
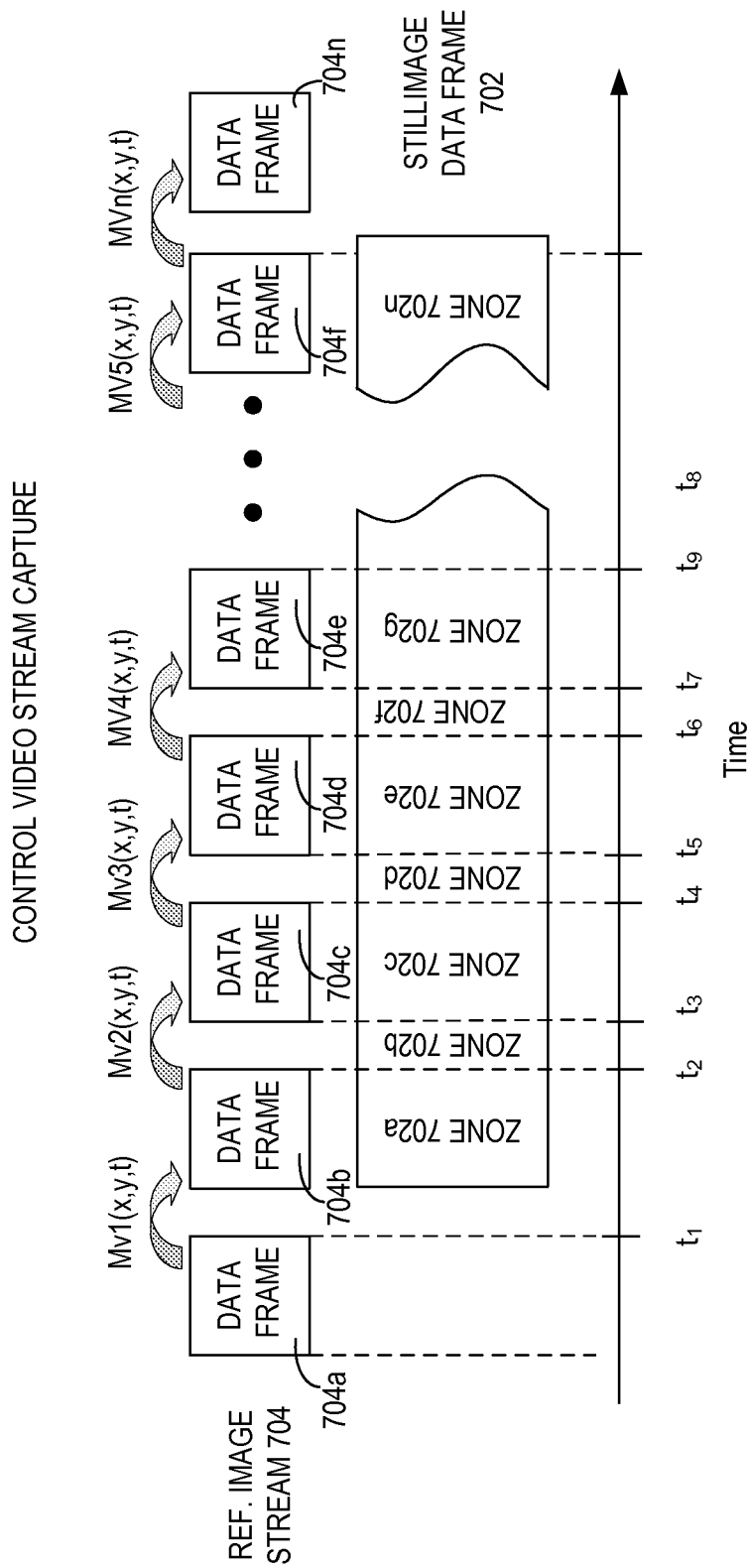
FIG. 7a is a schematic diagram illustrating adjustment of image data for a still image, consistent with one embodiment of the invention.

FIG. 7a is a timing diagram illustrating the adjustment of image data frame 702 representing a still image of a scene that a user may capture. Data frame 702 may be generated by, for example, primary image sensor 114 of system 100 or 400, or handheld device 202. Reference image stream 704 may include data frames 704a-n and may be generated by, for example, secondary image sensor 118 of system 100 or 400, or handheld device 202. Secondary image sensor may operate at a faster frame rate and may produce data frames 704a-n in relation to data frame 702. Data frame 704a-n may be used to calculate sets of motion vectors MV1-MVn, to represent hand movement of a user in the x and y direction, during capturing of the still image. A motion vector may be calculated to represent the movement between two data frames of reference image stream 704. MV1(x, y, t) may represent the movement between data frames 704a and 704b, similarly MV2(x, y, t) may represent the movement between data frames 704b and 704c.

Depending on the type of shutter or shutter mode used during capture of the still image, sets of motion vectors or a global motion vector based on the sets of motion vectors may be used to adjust data frame 702 and remove blur from data frame 702. For example, data frame 702 may be image data that is generated using, for example, primary image sensor 114 of system 100 or 400, or handheld device 202, with a global shutter. The global shutter may expose the entire scene to primary image sensor 114 at the same time and primary image sensor 114 may generate rows and columns of pixel data corresponding to data frame 702 at the same time. Further, the pixel data corresponding to zones 702a-n may be read out from primary image sensor 114 at the same time and may cause a global blur across data frame 702.

Figure 7B:
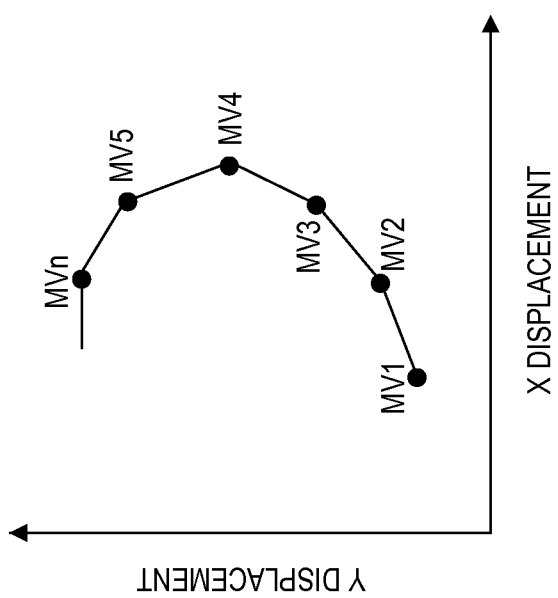
FIG. 7b is a schematic diagram illustrating motion vectors in the spatial domain, consistent with one embodiment of the invention.

The global blur across data frame 702 may be adjusted by calculating a global vector using the sets of motion vectors. The global blur may be dependent on the speed of the global shutter. Referring to FIG. 7b, time varying motion vectors MV1-MVn, may be converted into a spatially-varying correction kernel 740, as illustrated in FIG. 7b. Spatially-varying correction kernel 740 represents a function displaying displacement of data frames 704a-n in the x and y direction. The displacement between consecutive data frames may correspond to movement of the handheld device during generation of image data corresponding to the consecutive data frames. Each motion vector MV1-MVn corresponds to a particular zone 702a-n of the still image.
Spatially-varying correction kernel may be used to form a PSF, and algorithms such as inverse filtering or de-convolution may be performed by, for example, deblurring circuit 412 of system 400, to remove the global blur from data frame 702.

Returning now to FIG. 7a, data frame 702 may be image data that is generated by using, for example, primary image sensor 114 of system 100 or 400 or handheld device 202 in a "rolling shutter mode." The rolling shutter mode may expose different portion of the scene to primary image sensor 114 at different times, and may cause primary image sensor 114 to generate rows and columns of pixel data corresponding to zones 702a-n at different times. For example, rows and columns of pixels data corresponding to zone 702a may be generated between time $t_1$ and $t_2$. Further, the rows and columns of pixel data corresponding to zone 702a may be read out from primary image sensor 114, at the same time as rows and columns of pixel data corresponding to zone 702b may be generated. Reading out pixel data for each zone at a different time may cause a separate blur for each zone and a separate motion vector associated with each zone.

Motion vector MV1(x, y, t) may be used to remove the blur from zone 702a and motion vector MV2(x, y, t) may be used to remove the blur from zone 702c. Zones 702b, 702d, and 702f may not have a separate motion vector and the blur from these zones may be removed by calculating a motion vector based on the average of the motion vectors corresponding to adjacent zones in data frame 702.

The blur may be removed using, for example, deblurring circuit 414 of system 400. Deblurring circuit 414 may use motion vectors MV1-MVn to model the hand movement of the user as uniform linear motion in each zone and may perform de-convolution or simple interpolation to remove the blur. For example, deblurring circuit 414 may use the equation:

$$g(x, y) = \int_0^T f(x - x_0(t), y - y_0(t))dt, \quad (5)$$

where g(x, y) may represent blurred image data corresponding to zone 702a, $x_0(t)$ may represent the motion represented by MV1 in the x direction, $y_0(t)$ may represent the motion represented by MV1 in the y direction, T may represent the time required to readout rows and pixels of data corresponding to zone 702a, and f (x, y) may represent image data corresponding to zone 702a, without the blur. Deblurring circuit 414 may use equation 5 to solve for f (x, y) and produce image data without the blur.

Deblurring circuit 414 may calculate averages of motion vectors MV1-MVn to remove blur from zones 702b, 702d, and 702f. For example, the average of MV1(x, y, t) and MV2 (x, y, t) may be used to calculate an average motion vector to remove the blur from zone 702b. Techniques known to those of skill in the art may be used to measure the rate of change of displacement in each direction to prevent abrupt transitions in the blur correction. For example, deblurring circuit 414 may use the equations:

$$x_0(t)=c_0 \cdot t/T, \, y_0(t)=b_0 \cdot t/T;$$

$$x_1(t)=c_1 \cdot t/T, \, y_1(t)=b_1 \cdot t/T; \quad (6)$$

$$x_{trans(0 \, to \, 1)}(t)=(c_0+c_1) \cdot t/T, \, y_0(t)=(b_0+b_1) \cdot t/T; \quad (7)$$

where $x_0$ and $y_0$ of equation 6 may represent the rate of change of displacements in the x and y directions with respect to zone 702a, $c_0$ and $b_0$ may represent the displacement in the x and y direction with respect to zone 702a and T may represent the integration time. Similarly, $x_1$ and $y_1$ may represent the rate of change of displacements in x and y directions with respect to zone 702c, and $c_1$ and $b_1$ may represent the displacement in the x and y direction with respect to zone 702c. Equation 6 may be used to measure the rate of change of displacement between zones 702a and 702c and equation 7 may then be used to approximate the displacements with respect to zone 702b. Deblurring circuit 414 may use the approximate displacements to remove blur from zone 702b. Further, blur from zones 702d and 702f may be removed by using equations 6 and 7 to measure average displacements.

Figure 8:
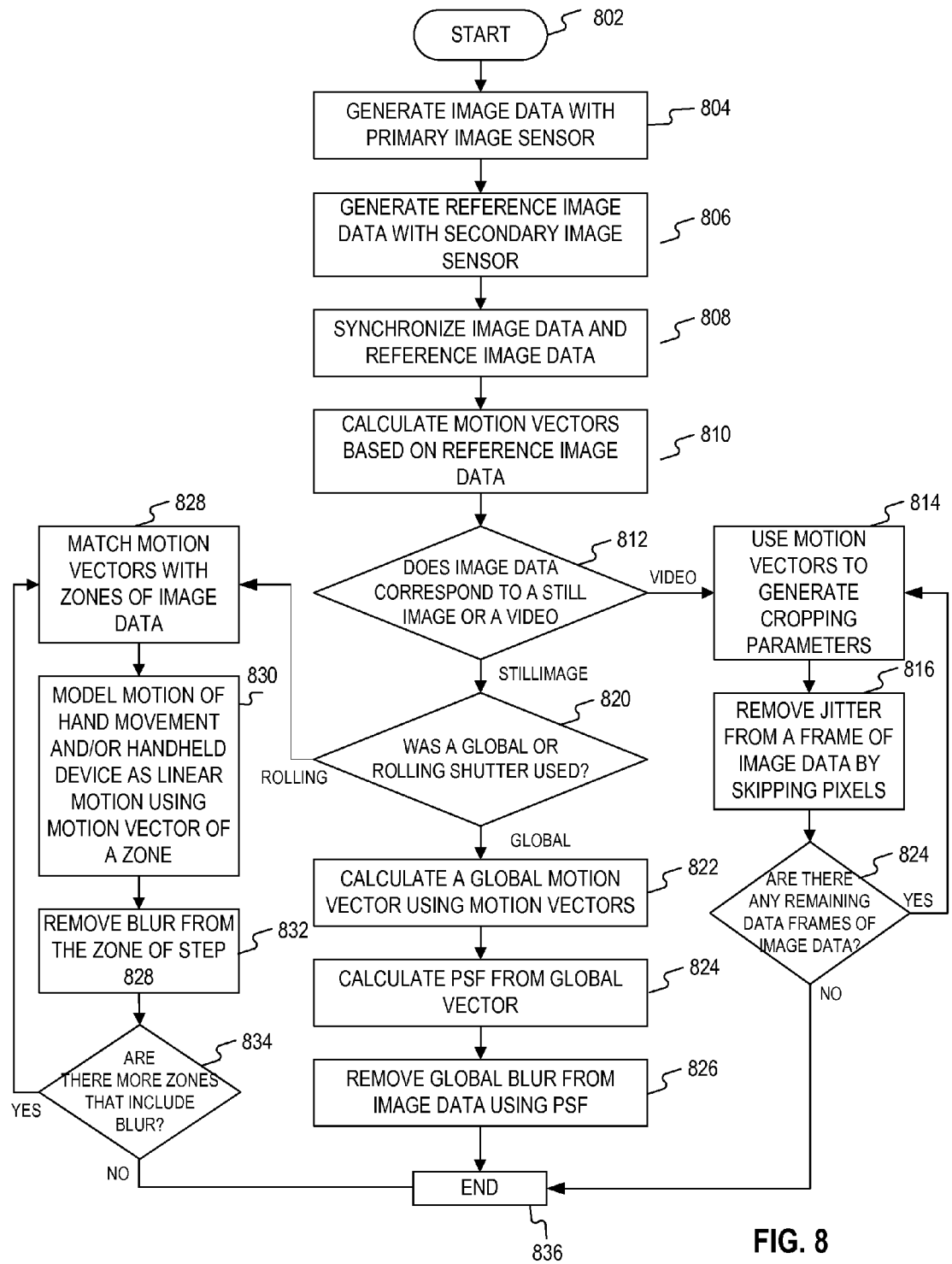
FIG. 8 is a flow diagram illustrating operation of a system for processing and adjusting image data, consistent with one embodiment of the invention.

FIG. 8 shows a flow diagram of a method 800 for processing and adjusting image data, consistent with one embodiment the invention. The method 800 begins in step 804 where a handheld device including a primary image sensor may be used by a user to capture a scene. Further, the primary image sensor may generate image data corresponding to the scene. In step 806, a secondary image sensor may be activated simultaneously, with, before, or after the primary image sensor and may generate reference image data corresponding to an extended scene of the environment that the handheld device is being operated in. In step 808, the image data may be synchronized with reference image data. The method moves to step 810, where motion vectors may be calculated using reference image data. The motion vectors may represent the motion of the handheld device during capturing of the scene and may be caused by hand movement of the user Next, in step 812, it may be determined if the image data corresponds to a still image or a video of the scene. If the image data corresponds to a video of the scene, the method may move to step 814, where cropping parameters are generated using the motion vectors calculated in step 810. In step 816, the cropping parameters are used to remove jitter that may have been caused by hand movement of the user, from a data frame of the image data. The jitter may be removed in step 816, by using the cropping parameters to skip rows or columns of pixels of a data frame. In step 818, it may be determined if there are any remaining data frames of the image data generated, that may be effected by the hand movement of the user. If there are no remaining data frames then jitter has been removed from the image data and the method may end (step 836). If there are remaining data frames, the method may move back to step 814, where cropping parameters for a new data frame may be generated.

Returning now to step 812, when the image data is determined to correspond to a still image of the scene, the method may move to step 820. In step 820, it may be determined if a global shutter was used with the primary image sensor in step 804 or was primary image sensor used with a rolling shutter mode. When it is determined that global shutter was used, the method may move to step 822, where a global motion vector is calculated using the motion vectors calculated in step 810. The method moves to step 824, where a PSF may be calculated from the global motion vector. In step 826, a global blur, that may be present in the image data due to hand movement of the user during still image capturing, may be removed by performing de-convolution or inverse filtering using the PSF and the image data. The method may end when the global blur is removed (step 836).

Returning now to step 820, when it is determined that a primary image sensor was used with the rolling shutter mode, in step 804, the method may move to step 828, where the motion vectors calculated in step 810 may be matched with zones of image data. The method moves to step 830, where hand movement and/or motion of handheld device may be modeled as linear motions using a motion vector that may have been matched with a zone in step 828. In step 832, the blur in the matched zone of step 830 may be removed by using the linear motion models and the matched zone. The method may move to step 834, where it may be determined if there are any more zones of the image data generated in step 804, that may include blur. If there are remaining zones, the method may move back to step 828, where a motion vector may be matched with a new zone. When there are no remaining zones then blur has been removed from the image data and the method may end (step 836).

The foregoing description has been presented for purposes of illustration. It is not exhaustive and does not limit the invention to the precise forms or embodiments disclosed. Modifications and adaptations of the invention can be made from consideration of the specification and practice of the disclosed embodiments of the invention. For example, one or more steps of methods described above may be performed in a different order or concurrently and still achieve desirable results.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A system for stabilizing an image displayed on a device by processing image data captured by the device, the system comprising:
   a primary image sensor configured to generate primary image data, wherein the primary image data comprises one or more first data frames;
   a secondary image sensor configured to generate secondary image data, wherein the secondary image data comprises a plurality of second data frames (i) corresponding to the one or more first data frames of the primary image data and (ii) synchronized with the one or more first data frames of the primary image data;
   a correlation circuit configured to calculate, using (i) second data frames of the plurality of second data frames of the secondary image data and (ii) the second data frames' corresponding first data frames of the one or more first data frames of the primary image data, at least one motion vector, wherein the at least one motion vector is based on a motion of the device during generation of the primary image data; and
   a data processor configured to process the primary image data based on the at least one motion vector in order to stabilize the image.

2. The system of claim 1, further comprising:
   a primary interface circuit to receive the primary image data from the primary image sensor; and
   a secondary interface circuit to receive the secondary image data from the secondary image sensor;
   wherein the primary interface circuit and the secondary interface circuit are configured to synchronize the plurality of second data frames of the secondary image data with the one or more first data frames based on (i) a first count value embedded in each of the one or more first data frames of the primary image data and (ii) a second count value embedded in each of the plurality of second data frames of the secondary image data.

3. The system of claim 1, further comprising a memory device to store the processed primary image data.

4. The system of claim 1, further comprising a liquid crystal display panel configured to at least one of (i) preview a scene and (ii) display the processed primary image data.

5. The system of claim 4, further comprising a keypad panel to generate a trigger event to terminate the previewing of the scene, wherein the trigger event initiates generation of primary image data.

6. The system of claim 1, further comprising a transmitter to transmit the processed primary image data.

7. The system of claim 1, wherein the primary image data represents one of (i) a still image or (ii) a video.

8. The system of claim 1, further comprising a kernel estimation circuit to convert the at least one motion vector to a spatially varying function.

9. The system of claim 1, wherein the data processor comprises at least one of (i) a deblurring circuit or (ii) a third interface circuit.

10. The system of claim 1, further comprising a data compressor to compress the processed primary image data.

11. The system of claim 1, wherein the primary image sensor operates in a rolling shutter mode.

12. The system of claim 1, wherein the device is one of (i) a cell phone or (ii) a personal digital assistant.

13. The system of claim 1, wherein:
   the primary image sensor is pointed in a first direction; and
   the secondary image sensor is pointed in a second direction.

14. A method for stabilizing an image displayed on a device by processing image data captured by the device, the method comprising:
- generating primary image data, wherein the primary image data comprises one or more first data frames;
- generating secondary image data, wherein the secondary image data comprises a plurality of second data frames (i) corresponding to the one or more first data frames of the primary image data and (ii) synchronized with the one or more first data frames of the primary image data;
- calculating, using (i) second data frames of the plurality of second data frames of the secondary image data and (ii) the second data frames' corresponding first data frames of the primary image data, at least one motion vector, wherein the at least one motion vector is based on a motion of the device during generation of the primary image data;
- based on the at least one motion vector, processing the primary image data in order to stabilize the image; and
- outputting the processed primary image data.

15. The method of claim 14, further comprising synchronizing the plurality of second data frames of the secondary image data with the one or more first data frames of the primary image data, wherein the synchronizing is based on (i) a first count value embedded in each of the one or more first data frames of the primary image data and (ii) a second count value embedded in each of the plurality of second data frames of the secondary image data.

16. The method of claim 14, further comprising calculating motion of the device based on the plurality of second data frames.

17. The method of claim 14, further comprising converting the at least one motion vector to a spatially varying function.

18. The method of claim 14, further comprising:
- compressing the processed primary image data; and
- displaying the compressed primary image data.

19. The method of claim 14, wherein the primary image data represents one of (i) a still image or (ii) a video.

20. The method of claim 14, wherein the device is one of (i) a cell phone or (ii) a personal digital assistant.

* * * * *